Figure 1:
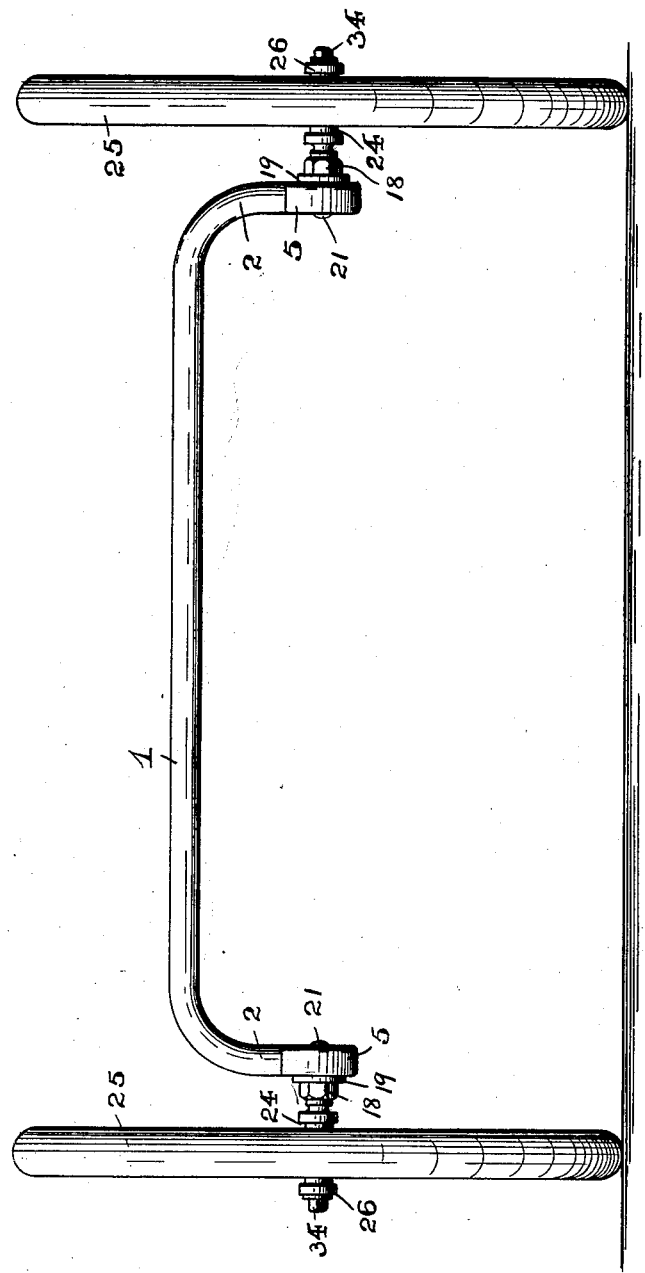

No. 735,984. PATENTED AUG. 11, 1903.
J. T. KENTER.
AXLE FOR VEHICLES.
APPLICATION FILED APR. 3, 1902.
NO MODEL. 2 SHEETS—SHEET 1.

WITNESSES: INVENTOR:
Geo. D. Richards, JOHN T. KENTER,
N. B. Fraentzel. BY Fred'k C. Fraentzel,
ATTORNEY No. 735,984. PATENTED AUG. 11, 1903.
J. T. KENTER.
AXLE FOR VEHICLES.
APPLICATION FILED APR. 3, 1902.
NO MODEL. 2 SHEETS—SHEET 2.
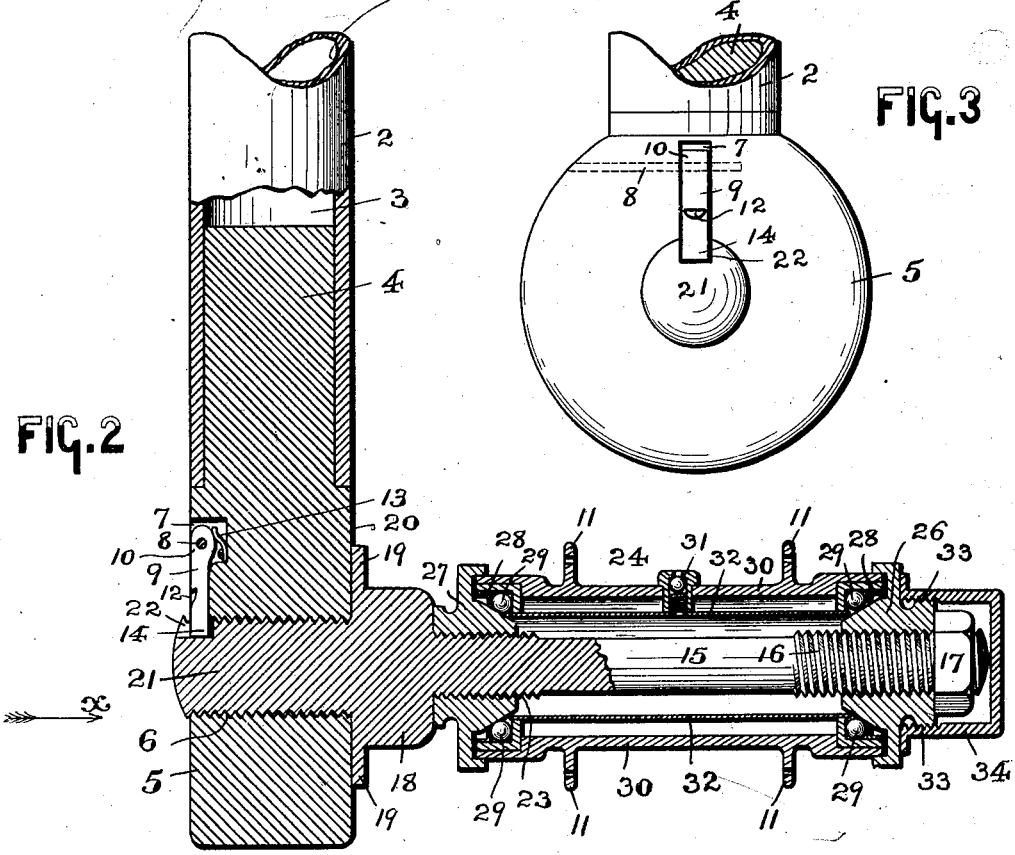
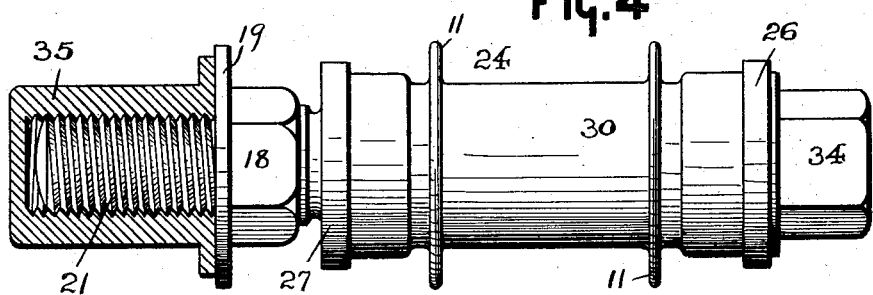
WITNESSES:
Geo. D. Richards
N. B. Fraentzel
INVENTOR
JOHN T. KENTER,
BY
Fred'k C. Fraentzel,
ATTORNEY
THE NORRIS PETERS CO., PHOTO-LITHO., WASHINGTON, D. C.

No. 735,984. Patented August 11, 1903.

UNITED STATES PATENT OFFICE.

JOHN T. KENTER, OF ALLWOOD, NEW JERSEY.

AXLE FOR VEHICLES.

SPECIFICATION forming part of Letters Patent No. 735,984, dated August 11, 1903.

Application filed April 3, 1902. Serial No. 101,169. (No model.)

*To all whom it may concern:*

Be it known that I, JOHN T. KENTER, a citizen of the United States, residing at Allwood, in the county of Passaic and State of New Jersey, have invented certain new and useful Improvements in Axles for Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention has reference generally to improvements in vehicles; and the invention relates more particularly to a novel construction of axle and a novel means of securing to and connecting with the axle a perfectly dust-proof hub of a wheel, which is preferably provided with a ball-bearing, the said hub and wheel being always retained in position upon an axle journal or spindle, which is detachably connected with the axle or "arch" of a vehicle.

The principal objects of my present invention are to provide a novel arrangement of combined axle-journal or spindle and a wheel preferably provided with a ball-bearing, the hub of the wheel being permanently and operatively arranged upon said axle journal or spindle, but the said journal or spindle being detachably connected with the main axle or arch for the purpose of protecting the ball-bearing of the hub when removing the wheel from the axle and to provide a perfectly dustproof hub.

It has been found in practice in ball-bearing hubs which are removably placed upon the axle-journals, forming integral and nondetachable parts of the axle-body or arch, that in removing the wheel and its hub the ball-bearing becomes exposed to the dust, whereas in the present construction, the axle journal or spindle at all times being left directly in the hub of the wheel, the ball-bearings are left perfectly safe and free from dust and grit.

A further object of this invention is to provide a novel arrangement and construction of wheel and its hub, in the ball-bearing portions of which the axle journal or spindle always remains when disconnected from the axle proper, thereby providing a great convenience in shipping, since there are no long axle-journals integrally connected with the main axle and projecting at either end from said main axle. Furthermore, the axle-journal in the present case remaining in the hub of the wheel and having its screw-threaded portion protected by means of a screw-cap, a readily detachable and removable wheel from the main axle is provided, whereby the said wheel can be readily and safely packed for shipment with its bearings free from dirt, dust, and grit.

A further object of this invention is to provide a strong and durable axle and to provide a vehicle which shall present a more speedy and finished appearance, and finally to provide a simple arrangement of the various parts whereby any unskilled person who might carelessly handle the wheel and its hub can readily remove the wheel without any danger of sliding the bearing portions of the hub upon the screw-threads for the nut of the axle-journal as heretofore, and, furthermore, the journal in this case remaining directly within the hub the wheel can be more easily handled and quickly and perfectly cleaned.

Other objects of this invention not at this time more especially mentioned, such as a novel means for preventing accidental displacement of the axle journal or spindle from the axle or arch, will be evident from the following detailed description of my invention.

The invention therefore consists in the novel arrangement and combination of devices and their parts, all of which will be hereinafter more fully set forth and then finally embodied in the clauses of the claim.

The invention is clearly illustrated in the accompanying drawings, in which—

Figure 1 is a view of an axle of a vehicle and a pair of wheels connected therewith by means of the combined hub and the axle journal or spindle according to the principles of this invention. Fig. 2 is a longitudinal vertical section of a ball-bearing hub and the axle journal or spindle, with a sectional representation of one end portion of an axle or arch, the said view illustrating the manner of detachably connecting the said axle-journal and hub to said portion of the axle or arch, and illustrating, furthermore, a locking means or catch which prevents the turning of said axle-journal with relation to the end portion of the axle or arch to which it is attached. Fig. 3 is an end view of the said parts represented in Fig. 2 of the drawings when looking in the direction of the arrow x. Fig. 4 is an elevation of the said bearing-hub and the axle journal or spindle detached from the said axle or arch, illustrating in connection with said axle-journal in vertical section a screw-cap for protecting the screw-threads upon the end of the axle-journal when removed from the axle; and Fig. 5 is an end view of the said parts represented in said Fig. 4.

Similar characters of reference are employed in all of the said above-described views to indicate corresponding parts.

In the said drawings the reference character 1 indicates an axle or arch of a vehicle, the same in the present case being made of tubular iron and having at its two end portions a pair of downwardly-extending members 2. In the lower tubular portion of each member 2, forming the receiving-sockets 3, (see Fig. 2 of the drawings,) I have arranged and suitably secured therein in any manner the shank 4 of a solid bar or member 5, the lower portion of each member 5 being preferably of the configuration represented in Fig. 3 of the drawings and being provided with a screw-threaded hole or opening 6, substantially as illustrated. The said member 5 is also preferably made with a receiving-recess 7 and has a pin 8, upon which is pivotally arranged the eye portion 10 of a holding catch or dog 9. The said catch or dog 9 is preferably made with a finger-piece 12, and directly back of the eye portion 10 of the catch or dog 9 may be placed a suitable spring 13, which serves to normally force the lower end portion 14 of the said catch or dog 9 directly into the screw-threaded opening or hole 6 in the manner illustrated in said Figs. 2 and 3. The said axle journal or spindle previously mentioned is indicated by the reference character 15, and the same is made with a screw end 16, upon which is arranged a nut 17. Near the opposite end portion of the said axle journal or spindle 15 the same is made with a nut-shaped enlargement 18 for the reception of a wrench, and 19 is a suitable flange which is brought against one of the flat surfaces, as 20, of the member 5 when the said axle journal or spindle 15 is securely screwed by means of a screw-threaded end portion or member 21 into the screw-threaded hole or opening 6 of said member 5. The said screw-threaded end portion 21 of the said axle journal or spindle 15 may also be made with a longitudinally-extending groove or channel 22, into which the said lower end portion 14 of the holding catch or dog 9 can be made to project, as illustrated in Figs. 2 and 3 of the drawings, to prevent rotary and accidental displacement of the said axle journal or spindle 15 when the latter has been secured in its operative position, as will be clearly understood. Contiguous to the said nut-shaped enlargement 18 upon said axle journal or spindle 15 is a screw-thread 23. The ball-bearing hub 24 of the wheel 25 is of any well-known construction, and it is permanently secured in its rotary position upon the said axle journal or spindle 15 by means of the usual cone-shaped members 26 and 27, which are screwed upon the respective screw-threads 16 and 23 of the said axle journal or spindle 15 against the face of the nut-shaped enlargement 18 and then held in place by means of the nut 17. The ball-bearing hub 24 is made with the usual forms of ball-races 28, containing a number of antifriction balls or rollers 29, and with the hub-sleeve 30, the oil-valve 31, and an inner oil-retaining tube 32, all of which will be clearly understood from an inspection of Fig. 2.

The hub-sleeve 30 is made with the usual spoke-flanges 11, to which the rim of the wheel 25 is secured by means of the usual spokes. (Not shown in the present case.) The cone-shaped member 26 is also made with a screw-threaded portion 33 for the arrangement thereon of a screw-cap 34, which covers the said nut 17 and prevents the accidental displacement of the nut.

Of course it will be clearly understood that I do not limit myself to the form and construction of ball-bearing hub 24, herein shown, for I am fully aware that the axle journal or spindle 15 may be used with any other forms and constructions of wheel-hubs.

When the wheel and hub and the various component parts of the hub have been assembled in their rotative and operative positions upon the axle journal or spindle 15 in the manner illustrated in Figs. 2 and 4, then the said axle journal or spindle 15 can be arranged in its position against the side of the member 5, connected with the axle or arch 1, by screwing the screw portion or member 21 into the screw-threaded hole or opening 6, and by throwing the holding latch or dog 9 into its locked or holding engagement with the groove or channel 22 any possible rotative movement of said axle journal or spindle 15 is fully overcome and there is no danger of any accidental displacement of the said parts. When the combined wheel and hub and the axle journal or spindle 15 have been removed from the said member 5 for shipping purposes or for the purpose of readily cleaning the spokes of the wheel, a nut-shaped screw-cap 35 can be screwed upon the screw-threaded end portion of the member 21 of the axle journal or spindle to prevent any damage of the screw-threads on said portion 21, as illustrated in Figs. 4 and 5.

From the previous description of my invention it will be seen that I have devised a simple and effective arrangement and construction of parts which enables any person to quickly detach the wheel from the axle of a vehicle without disturbing the parts of the ball-bearing and without any possibility, as in the ordinary construction now in vogue, where the axle-journal forms an integral and inseparable part of the axle or arch, of bringing the screw-threads of the journal against the inner members of the hub while slipping the hub and wheel from the axle, and thereby perhaps render the said parts useless. Furthermore, in the present construction the axle journal or spindle 15 at all times forming an inseparable part of the hub and its ball-bearings the hub always remains closed at its ends, and is therefore perfectly dust-proof and will be free from dirt and grit. The separable arrangement of the short axle journal or spindle furthermore has this advantage: When removed from the member 5 and when the cap 34 is screwed in place upon the end portion 21, all the parts are fully protected and can safely be packed for shipment in a much smaller space than is at present the case without any danger of disturbing the previously-adjusted bearing portions, and also keeping these parts free from dust, grit, and water.

I am fully aware that changes may be made in the various arrangements and combinations of the devices and their parts without departing from the scope of my present invention. Hence I do not limit my invention to the exact arrangements and combinations of the said devices and their parts nor do I confine myself to the exact details of the construction of the said parts.

Having thus described my invention, what I claim is—

1. The combination, with an axle, provided with a member having a screw-threaded hole, of an axle-journal, a screw-threaded member on said axle-journal adapted to be screwed into said screw-threaded hole in said axle, and a hub and wheel rotatively arranged on said axle-journal, all in such a manner, that the said hub and said axle-journal are inseparably connected when said screw-threaded member of said axle-journal is unscrewed from the screw-hole in said axle, a groove or channel in the said screw-threaded member of said axle-journal, and a spring-actuated holding-catch pivotally connected with a part of said axle and having its free end portion adapted to be brought in holding engagement with the said groove or channel in said screw-threaded member of the axle-journal, substantially as and for the purposes set forth.

2. The combination, with a tubular body portion of an axle, having a pair of downwardly-extending members provided with receiving-sockets, of a member 5 secured to each downwardly-extending member of the body portion of said axle, and an axle-journal detachably connected with each member 5, substantially as and for the purposes set forth.

3. The combination, with a tubular body portion of an axle, having a pair of downwardly-extending members provided with receiving-sockets, of a member 5 secured to each downwardly-extending member of the body portion of said axle, an axle-journal detachably connected with each member 5, and a hub and wheel rotatively arranged on each axle-journal, all in such a manner, that the said hub and axle-journal are inseparably connected when the axle-journal is disconnected from said member 5, substantially as and for the purposes set forth.

4. The combination, with a tubular body portion of an axle, having a pair of downwardly-extending members provided with receiving-sockets, of a member 5 secured to each downwardly-extending member of the body portion of said axle, an axle-journal detachably connected with each member 5, a hub and wheel rotatively arranged on each axle-journal, all in such a manner, that the said hub and axle-journal are inseparably connected when the axle-journal is disconnected from said member 5, and means on said member 5 adapted to be brought in separable holding engagement with a portion of said axle-journal to lock the same against rotation, substantially as and for the purposes set forth.

5. The combination, with a tubular body portion of an axle, having a pair of downwardly-extending members provided with receiving-sockets, of a member 5 secured to each downwardly-extending member of the body portion of said axle, each member 5 being provided with a screw-threaded hole, and an axle-journal, a screw-threaded member on said axle-journal by means of which said axle-journal is screwed into said screw-threaded hole of the member 5, substantially as and for the purposes set forth.

6. The combination, with a tubular body portion of an axle, having a pair of downwardly-extending members provided with receiving-sockets, of a member 5 secured to each downwardly-extending member of the body portion of said axle, each member 5 being provided with a screw-threaded hole, an axle-journal, a screw-threaded member on said axle-journal by means of which said axle-journal is screwed into said screw-threaded hole of the member 5, and a hub and wheel rotatively arranged on each axle-journal, all arranged in such a manner, that the said hub and axle-journal are inseparably connected when said screw-threaded member of said axle-journal is unscrewed from said screw-hole in said member 5, substantially as and for the purposes set forth.

7. The combination, with a tubular body portion of an axle, having a pair of downwardly-extending members provided with receiving-sockets, of a member 5 secured to each downwardly-extending member of the body portion of said axle, each member 5 being provided with a screw-threaded hole, an axle-journal, a screw-threaded member on said axle-journal by means of which said axle-journal is screwed into said screw-threaded hole of the member 5, a hub and wheel rotatively arranged on each axle-journal, all in such a manner, that the said hub and axle-journal are inseparably connected when said screw-threaded member of said axle-journal is unscrewed from said screw-hole in said member 5, and means on said member 5 adapted to be brought in separable holding engagement with a portion of said axle-journal to lock the same against rotation, substantially as and for the purposes set forth.

8. The combination, with a tubular body portion of an axle, having a pair of downwardly-extending members provided with receiving-sockets, of a member 5 secured to each downwardly-extending member of the body portion of said axle, each member 5 being provided with a screw-threaded hole, an axle-journal, a screw-threaded member on said axle-journal by means of which said axle-journal is screwed into said screw-threaded hole of the member 5, a hub and wheel rotatively arranged on each axle-journal, all in such a manner, that the said hub and axle-journal are inseparably connected when said screw-threaded member of said axle-journal is unscrewed from said screw-hole in said member 5, and means on said member 5 adapted to be brought in separable holding engagement with a portion of said axle-journal to lock the same against rotation, consisting, essentially, of a groove or channel in the said screw-threaded member of said axle-journal, and a spring-actuated holding-catch pivotally connected with a part of said member 5 and having its free end portion adapted to be brought in holding engagement with the said groove or channel in the screw-threaded member of the axle-journal, substantially as and for the purposes set forth.

In testimony that I claim the invention set forth above I have hereunto set my hand this 31st day of March, 1902.

JOHN T. KENTER.

Witnesses:
    FREDK. C. FRAENTZEL,
    GEO. D. RICHARDS.